US010062195B2

(12) United States Patent
Chevet et al.

(10) Patent No.: US 10,062,195 B2
(45) Date of Patent: Aug. 28, 2018

(54) METHOD AND DEVICE FOR PROCESSING A PICTURE (71) Applicant: THOMSON LICENSING, Issy les Moulineaux (FR)

(72) Inventors: Jean-Claude Chevet, Betton (FR); Fabrice Urban, Thorigne Fouillard (FR); Christel Chamaret, Chantepie (FR)

(73) Assignee: THOMSON Licensing, Issy-les-Moulineaux (FR)

( * ) Notice: Subject to any disclaimer, the term of this patent is extended or adjusted under 35 U.S.C. 154(b) by 0 days.

(21) Appl. No.: 15/123,688

(22) PCT Filed: Feb. 26, 2015

(86) PCT No.: PCT/EP2015/054035
§ 371 (c)(1),
(2) Date: Sep. 6, 2016

(87) PCT Pub. No.: WO2015/132125
PCT Pub. Date: Sep. 11, 2015

(65) Prior Publication Data
US 2017/0018106 A1    Jan. 19, 2017

(30) Foreign Application Priority Data
Mar. 6, 2014 (EP) .................................... 14305324

(51) Int. Cl.
*G09G 5/00* (2006.01)
*G06T 11/60* (2006.01)
(Continued)

(52) U.S. Cl.
CPC ................ *G06T 11/60* (2013.01); *G06T 7/73* (2017.01); *G11B 27/034* (2013.01); *G11B 27/28* (2013.01); *G06T 2210/22* (2013.01)

(58) Field of Classification Search
CPC ........... G06K 9/36–9/527; G06T 11/60; G06T 2210/22
See application file for complete search history.

(56) References Cited

U.S. PATENT DOCUMENTS 8,406,515 B2 *  3/2013  Cheatle .................. G06T 11/60
                                              382/164
8,938,100 B2 *  1/2015  Ptucha ................... G06T 11/60
                                              382/118
(Continued)

FOREIGN PATENT DOCUMENTS

EP    1695288    6/2005
EP    1764736    3/2007
(Continued)

OTHER PUBLICATIONS

Delakis et al., "Convolutional Face Finder: A Neural Architecture for Fast and Robust Face Detection", IEEE Transactions on Pattern Analysis and Machine Intelligence, vol. 26, No. 11, Nov. 2004, pp. 1408-1423.

(Continued)

Primary Examiner — Charles Tseng
(74) Attorney, Agent, or Firm — Brian J. Dorini; Jeffrey M. Navon (57) ABSTRACT A method for processing a picture comprising at least one face is provided. The method comprises: —obtaining (S10) a cropping window in the picture; —processing (S18) the picture by cropping the picture part delimited by the cropping window; wherein the method further comprises detecting (S12) the at least one face, determining (S14) a weight for the detected at least one face and modifying (S16) the position of the cropping window in the picture based on the weight, wherein the weight is determined at least based on the size of the corresponding detected face.

9 Claims, 7 Drawing Sheets (51) Int. Cl.
*G11B 27/034* (2006.01)
*G11B 27/28* (2006.01)
*G06T 7/73* (2017.01)

(56) References Cited

U.S. PATENT DOCUMENTS

| | | | |
|---|---|---|---|
| 8,957,865 B2* | 2/2015 | Cieplinski | G06F 3/04883 |
| | | | 345/173 |
| 9,070,182 B1* | 6/2015 | Chua | G06T 3/0012 |
| 9,292,756 B2* | 3/2016 | Welinder | G06K 9/00979 |
| 2002/0089516 A1 | 7/2002 | Sobol | |
| 2008/0181512 A1 | 7/2008 | Gavin et al. | |
| 2008/0304745 A1 | 12/2008 | Honma | |
| 2009/0208118 A1 | 8/2009 | Csurka | |
| 2012/0093418 A1 | 4/2012 | Kim et al. | |

FOREIGN PATENT DOCUMENTS

| | | |
|---|---|---|
| EP | 1814082 | 8/2007 |
| EP | 2249307 | 11/2010 |
| WO | WO2005059832 | 6/2005 |

OTHER PUBLICATIONS

Han et al., "Geometric and Texture Cue Based Depth-map Estimation for 2D to 3D Image Conversion", IEEE International Conference on Consumer Electronics (ICCE), Chiang Mai, Thailand, Nov. 28, 2011, pp. 651-652.

Itti et al., "A Model of Saliency-Based Visual Attention for Rapid Scene Analysis", IEEE Transactions on Pattern Analysis and Machine Intelligence, vol. 20, No. 11, Nov. 1998, pp. 1254-1259.

Tong et al., "Blur Detection for Digital Images Using Wavelet Transform", IEEE International Conference on Multimedia and Expo, Taipei, Taiwan, Jun. 27, 2004, pp. 17-20.

Viola et al., "Rapid Object Detection using a Boosted Cascade of Simple Features", IEEE Conference on Computer Vision and Pattern Recognition, Kauai, Hawaii, USA, Dec. 8, 2001, pp. 511-518.

Zhu et al., "Fast Face Detection Using Subspace Discriminant Wavelet Features", IEEE Conference on Computer Vision and Pattern Recognition, Hilton Head Island, South Carolina, USA, Jun. 13, 2000, pp. 636-642.

Suh et al: "Automatic thumbnail cropping and its effectiveness"; ACM Symposium on User Interface Software and Technology, 95-104; 2003.

Kiess et al: "Improved Image Retargeting by Distinguishing between Faces in Focus and out of Focus"; Multimedia and Expo Workshops (ICMEW), 2012 IEEE; Jul. 9-13, 2012.

Byoung Chul Ko et al: "Object-of-interest image segmentation based on human attention and semantic region clustering"; Abstract; Journal of the Optical Society of America; Oct. 1, 2006.

Kiess et al: "SeamCrop for image retargeting"; Proc. SPIE 8304, Multimedia on Mobile Devices 2012; and Multimedia Content Access: Algorithms and Systems VI; Feb. 1, 2012.

Saxena et al: "Learning Depth from Single Monocular Images"; ICCV workshop on 3D Representation for Recognition, 2007.

Vaquero et al: "A survey of image retargeting techniques"; SPIE, 2010.

Baveye et al: "Image and video saliency models improvement by blur identification" ; ICCVG; 2012.

* cited by examiner

METHOD AND DEVICE FOR PROCESSING A PICTURE

This application claims the benefit, under 35 U.S.C. § 365 of International Application of PCT/EP15/054035, filed Feb. 26, 2015, which was published in accordance with PCT Article 21(2) on Sep. 11, 2015, in English, and which claims the benefit of European patent application No. 14305324.7, filed Mar. 6, 2014.

1. FIELD OF THE INVENTION

In the following, a method for processing a picture is disclosed. Specifically, a method for processing a picture comprising at least one face is disclosed, wherein processing comprising cropping said picture. Corresponding device is also disclosed.

2. BACKGROUND OF THE INVENTION

For navigation applications in a set of fixed pictures or videos, it is useful to be able to display all the pictures or videos at a single glance. For this purpose, it is interesting to generate a reduced size version of each fixed picture or each picture of the videos so that said pictures or videos are displayed simultaneously on a same screen and are able to be compared easily. Likewise, for a broadcast application of a video content on a mobile device having a small sized screen, e.g. on a mobile phone or on a PDA, it is necessary to generate a reduced size version of each picture of the video in order to display them on the small sized screen.

A method known to a person skilled the art to generate these reduced pictures or videos from a source picture or video consists in subsampling said source picture or video. In the case of a significant reduction in size some picture parts are unusable by the user as they are too small.

Cropping a part of the picture containing the most salient or visually attractive areas of the picture is another method. However, in the presence of multiple faces in the picture, such method often fails to define an appropriate cropping window in the picture.

3. BRIEF SUMMARY OF THE INVENTION

A method for processing a picture comprising at least one face is disclosed. The method comprises:
  obtaining a cropping window in the picture;
  processing the picture by cropping the picture part delimited by the cropping window; wherein the method further comprises detecting the at least one face, determining a weight for the detected at least one face and modifying the position of the cropping window in the picture based on the weight, wherein the weight is determined at least based on the size of the corresponding detected face.

Advantageously, the processed picture is of better quality because the presence of faces is taken into account.

According to a specific embodiment, modifying the position of the cropping window in the picture based on the weight comprises:
  determining a bounding box around the at least one face; and
  modifying the position of the cropping window so that it is centered on the bounding box.

In a variant, the picture comprises a plurality of faces. In this case, the detection and the determination of a weight are performed for each face of the plurality of faces.

In this variant, modifying the position of the cropping window in the picture based on the weights comprises:
  a) ordering the plurality of faces in a decreasing order of the weights to form an ordered list of faces;
  b) modifying the position of the cropping window so that it is centered on a bounding box comprising at least the first face of the ordered list;
  c) enlarging the bounding box by adding a next face of the ordered list;
  d) repeating steps b) and c) until the bounding box becomes larger than the cropping window.

Advantageously, the step a) is followed by a step a') comprising calculating the differences between the weights of two consecutive faces in the ordered list and removing from the ordered list of faces, the faces following a difference above a threshold value.

Exemplarily, determining a weight for each face of the plurality of faces comprises for one face:
  determining a level of sharpness;
  determining a level of depth;
  determining a level of saliency; and
  calculating the weight for each of the two faces as a linear combination of the level of sharpness, the level of depth, the level of saliency and the size.

A device for processing a picture comprising at least one face is disclosed. The device comprises at least one processor configured to:
  obtain a cropping window in the picture;
  process the picture by cropping the picture part delimited by the cropping window;
wherein the at least one processor is further configured to detect the at least one face, to determine a weight for the detected at least one face and to modify the position of the cropping window in the picture based on the weight, wherein the weight is determined at least based on the size of the corresponding detected face.

In a specific embodiment, modifying the position of the cropping window in the picture based on the weight comprises:
  determining a bounding box around the at least one face; and
  modifying the position of the cropping window so that it is centered on the bounding box.

In a variant, the picture comprises a plurality of faces and the detection and the determination of a weight are performed for each face of the plurality of faces.

In this case, modifying the position of the cropping window in the picture based on the weights comprises:
  a) ordering the plurality of faces in a decreasing order of the weights to form an ordered list of faces;
  b) modifying the position of the cropping window so that it is centered on a bounding box comprising at least the first face of the ordered list;
  c) enlarging the bounding box by adding a next face of the ordered list;
  d) repeating steps b) and c) until the bounding box becomes larger than the cropping window.

Advantageously, step a) is followed by a step a') comprising calculating the differences between the weights of two consecutive faces in the ordered list and removing from the ordered list of faces, the faces following a difference above a threshold value.

Exemplarily, determining a weight for each face of the plurality of faces comprises for one face:
  determining a level of sharpness;
  determining a level of depth;
  determining a level of saliency; and calculating the weight for each of the two faces as a linear combination of the level of sharpness, the level of depth, the level of saliency and the size.

A device for processing a picture comprising at least one face is disclosed. The device comprises:
- means for obtaining a cropping window in the picture;
- means for processing the picture by cropping the picture part delimited by the cropping window;

wherein the device further comprises means for detecting the at least one face, means for determining a weight for the detected at least one face and means for modifying the position of the cropping window in the picture based on the weight, wherein the weight is determined at least based on the size of the corresponding detected face.

According to a specific embodiment of the invention, the means for modifying the position of the cropping window in the picture based on the weight comprises:
- means for determining a bounding box around the at least one face; and
- means for modifying the position of the cropping window so that it is centered on the bounding box.

In a variant, in which the picture comprises a plurality of faces, the means for detecting and the means for determining a weight are configured to perform detecting and determining a weight for each face of the plurality of faces.

A computer program product comprising program code instructions to execute of the steps of the processing method according to any of the embodiments and variants disclosed when this program is executed on a computer.

A processor readable medium having stored therein instructions for causing a processor to perform at least the steps of the processing method according to any of the embodiments and variants disclosed.

5. DETAILED DESCRIPTION OF THE INVENTION

Figure 1:
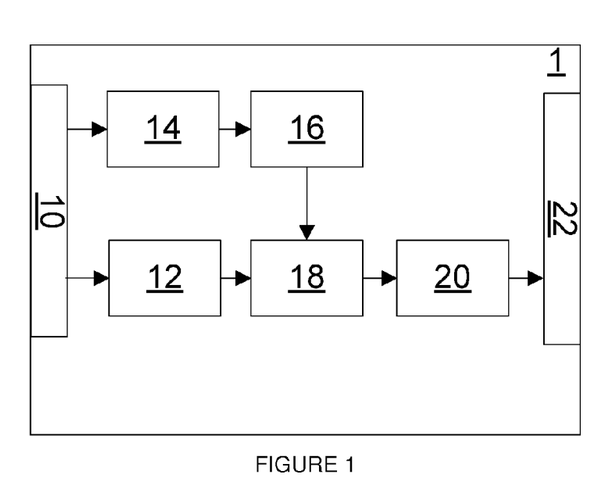
FIG. 1 depicts a device for processing a picture Y comprising at least one face according to a specific and non-limitative embodiment of the invention.

FIG. 1 depicts a device 1 for processing a picture Y comprising at least one face according to a specific and non-limitative embodiment of the invention. According to a variant, the picture comprises at least two faces. The processing device 1 comprises an input 10 configured to receive at least one picture Y. The picture Y may be obtained from a source. According to different embodiments of the invention, the source belongs to a set comprising:
- a local memory, e.g. a video memory, a RAM, a flash memory, a hard disk;
- a storage interface, e.g. an interface with a mass storage, a ROM, an optical disc or a magnetic support;
- a communication interface, e.g. a wireline interface (for example a bus interface, a wide area network interface, a local area network interface) or a wireless interface (such as a IEEE 802.11 interface or a Bluetooth interface); and
- an picture capturing circuit (e.g. a sensor such as, for example, a CCD (or Charge-Coupled Device) or CMOS (or Complementary Metal-Oxide-Semiconductor)).

The input 10 is linked to a module 12 configured to obtain a cropping window in the picture Y. The cropping window is also known in the literature as reframing window or extraction window. The input 10 is further linked to a face detection module 14 configured to detect at least one face in the picture Y. The face detection module 14 is in turn linked to a module 16 configured to determine a weight for each of the faces detected in the picture Y. Each weight is determined at least based on the size of the corresponding face. The outputs of the modules 12 and 16 are connected to a module 18 configured to modify the position of the cropping window in the picture Y based on the weights determined by the module 16. The module 18 is connected to a module 20 configured to process the picture Y by cropping the picture part delimited by the cropping window. The module 20 is linked to an output 22. The cropped picture part can be stored in a memory or can be sent to a destination. As an example, the cropped picture part is stored in a remote or in a local memory, e.g. a video memory or a RAM, a hard disk. In a variant, the cropped picture part is sent to a storage interface, e.g. an interface with a mass storage, a ROM, a flash memory, an optical disc or a magnetic support and/or transmitted over a communication interface, e.g. an interface to a point to point link, a communication bus, a point to multipoint link or a broadcast network.

Figure 2:
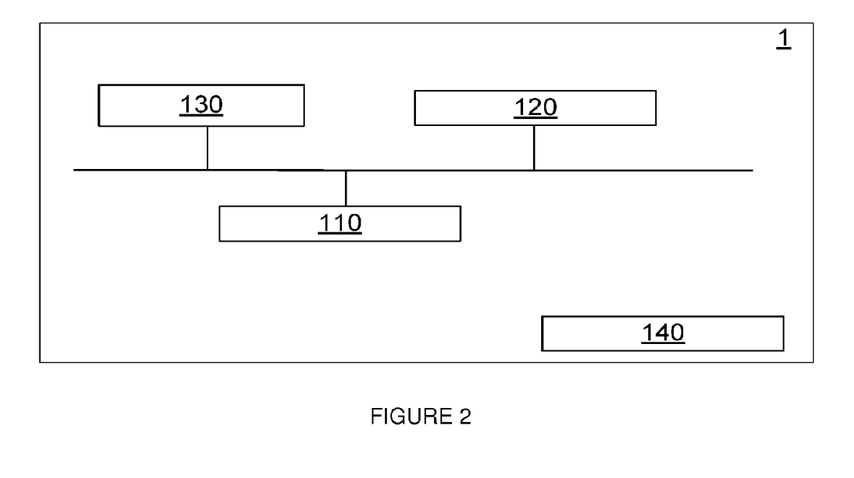
FIG. 2 represents an exemplary architecture of the processing device of FIG. 1 according to a specific and non-limitative embodiment of the invention.

FIG. 2 represents an exemplary architecture of the processing device 1 according to a specific and non-limitative embodiment of the invention. The processing device 1 comprises one or more processor(s) 110, which is(are), for example, a CPU, a GPU and/or a DSP (English acronym of Digital Signal Processor), along with internal memory 120 (e.g. RAM, ROM, EPROM). The processing device 1 comprises one or several Input/Output interface(s) 130 adapted to display output information and/or allow a user to enter commands and/or data (e.g. a keyboard, a mouse, a touchpad, a webcam, a display); and a power source 140 which may be external to the processing device 1. The processing device 1 may also comprise network interface(s) (not shown).

According to an exemplary and non-limitative embodiment of the invention, the processing device 1 further comprises a computer program stored in the memory 120. The computer program comprises instructions which, when executed by the processing device 1, in particular by the processor 110, make the processing device 1 carry out the processing method described with reference to FIG. 3. According to a variant, the computer program is stored externally to the processing device 1 on a non-transitory digital data support, e.g. on an external storage medium such as a HDD, CD-ROM, DVD, a read-only and/or DVD drive and/or a DVD Read/Write drive, all known in the art. The processing device 1 thus comprises an interface to read the computer program. Further, the processing device 1 could access one or more Universal Serial Bus (USB)-type storage devices (e.g., "memory sticks.") through corresponding USB ports (not shown).

According to exemplary and non-limitative embodiments, the processing device 1 is a device, which belongs to a set comprising:
- a mobile device;
- a communication device;
- a game device;
- a tablet (or tablet computer);
- a laptop;
- a still picture camera;
- a video camera;
- an encoding chip;
- a decoding chip;
- a still picture server;
- a video server (e.g. a broadcast server, a video-on-demand server or a web server); and
- a video sharing platform.

Figure 3:
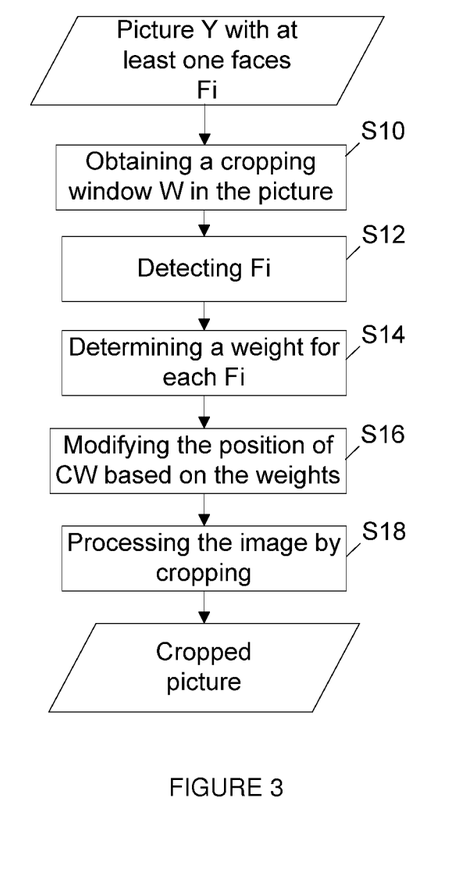
FIG. 3 represents a flowchart of a method for processing a picture Y comprising at least one face according to a specific and non-limitative embodiment of the invention.

FIG. 3 represents a flowchart of a method for processing a picture Y comprising at least one face according to a specific and non-limitative embodiment of the invention. In a variant, the picture comprises at least two faces.

In a step S10, a cropping window is obtained, e.g. by the module 12. Exemplarily, the cropping window is obtained from a memory. In this case, the cropping window was determined beforehand and stored in the memory. In a variant, the module 12 obtains the cropping window by applying the method disclosed in the European patent application EP2005291938. In this patent application, the cropping window is named extraction window. The method comprises first determining a saliency map from the picture Y. The saliency map is a two dimensional topographic representation of conspicuity of the picture. This map is normalized for example between 0 and 255. The saliency map is thus providing a saliency value per pixel that characterizes its perceptual relevancy. The higher the saliency value for a pixel, the more visually relevant the pixel. Exemplarily, the cropping window is obtained as follows:
a) positioning a current window in the picture that is centered on the pixel with the highest perceptual interest, i.e. the one having the highest saliency value;
b) computing a current ratio between a sum of saliency values associated with pixels in each window positioned in the picture and a saliency value associated with the picture;
c) if the current ratio is lower than a threshold:
   identifying the pixel of the picture, called new most salient pixel, with the highest saliency value just lower than the saliency value of the current most salient pixel;
   positioning a new window in the picture centered on their new most salient pixel, the new most salient pixel becoming the current most salient pixel and the new window becoming the current window;
   return to step b;
else defining said cropping window as the smallest window that comprises all windows currently positioned in the picture.

It will be appreciated, however, that the invention is not restricted to this specific method for obtaining a cropping window. The cropping window can be for example obtained by positioning a window of a known size in the picture centered on the pixel with the highest saliency value.

In a step S12, face(s) are detected in the picture Y, e.g. by the face detection module 14. The output of the method is a list of n detected faces Fi with their respective size Sz and position within the picture Y, where i and n are integer, $n \geq 1$ and $i \in [1; n]$. The detected face may cover more or less the true face. Indeed, the detected face is often a rectangle which may cover only partially the true face. In the following, the word "face" is used to mean a detected face. The face(s) is(are) for example detected by applying the method disclosed in the document from Viola et al entitled "*Rapid object detection using boosted cascade of simple features*" published in IEEE Conference on Computer Vision and Pattern Recognition in 2001. It will be appreciated, however, that the invention is not restricted to this specific method of faces detection. Any method adapted to detect faces in a picture is appropriate. The method disclosed by Zhu et al. in the paper entitled "*Fast Face Detection Using Subspace Discriminant Wavelet Features*" published in Proceedings of the International Conference on Computer Vision and Pattern Recognition, 2000 is another example of such a method. This method approximates the multi-template T by a low-dimensional linear subspace F, usually called the face space. Images are initially classified as potential members of T, if their distance from F is smaller than a certain threshold. The images which pass this test are projected on F and these projections are compared to those in the training set. In the paper entitled "*Convolutional Face Finder: A Neural Architecture for Fast and Robust Face Detection*" published in *IEEE Transactions on Pattern Analysis and Machine Intelligence*, 26(11), November 2004, Garcia et al disclose another approach based on a convolutional neural architecture designed to robustly detect highly variable face patterns.

In a step S14, a weight is determined for each of the detected face(s) responsive at least to the size Sz of these detected faces. The weight is determined for example by the module 16. Exemplarily, the weight for a face is equal to the size Sz of the face. The size Sz is for example the product of the height and the width in pixels of the detected face.

Figure 4:
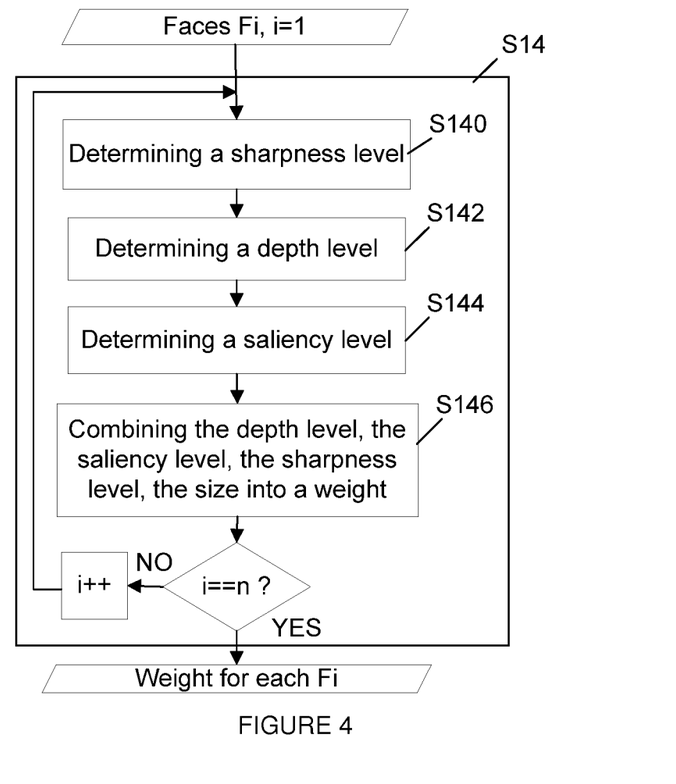
FIG. 4 represents a detail of the flowchart depicted on FIG. 3 according to a specific and non-limitative embodiment of the invention.

A variant of step S14 is depicted on FIG. 4. In a step S140, a sharpness level LBi is determined for one face Fi. The level of sharpness for the face Fi can be obtained by averaging sharpness values associated with the pixels located in the face Fi. When a face is blur, its sharpness level is low. On the contrary when a face is sharp, its sharpness level is high.

The method disclosed in the paper from Baveye et al entitled "*Picture and video saliency models improvement by sharpness identification*" published in ICCVG in 2012 can be used to determine such a sharpness level. This method provides a sharpness map that associates with each pixel in a picture a level of sharpness. In a paper entitled "*Blur detection for digital images using wavelet transform*" published in Proceedings of IEEE ICME, 2004, Tong et al. suggest to use wavelet transforms. Indeed, such transforms are able to both discriminate different types of edges and identify sharpness from blur. It will be appreciated, however, that the invention is not restricted to these specific methods of sharpness level determination.

In a step S142, a depth level LDi is determined for the face Fi. The level of depth for the face Fi can be obtained by averaging the depth values associated with the pixels located in the face Fi. When a face is close to the foreground, its depth level is high. On the contrary when a face is close to the background, its depth level is low. The method disclosed in the paper from Kyuseo et al entitled "*Geometric and texture Cue based depth-map estimation for 2D to 3D Picture conversion*" published in IEEE ICCE in 2011 can be used to estimate such a depth level. This method provides a depth map that associates with each pixel in a picture a level of depth. In a paper entitled "*Learning Depth from Single Monocular Images*" published in ICCV workshop on 3D Representation for Recognition, 2007, Saxena et al disclose a model using a hierarchical, multi-scale Markov Random Field (MRF) that incorporates multiscale local-image and global-image features, and models the depths and the relation between depths at different points in the image. It will be appreciated, however, that the invention is not restricted to this specific method of depth level determination.

In a step S144, a saliency level LSi is determined for the face Fi. The method disclosed in the European patent application EP2004804828 can be used to determine such a saliency level. This method provides a saliency map that associates with each pixel in a picture a level of saliency. A saliency level characterizes its perceptual relevancy. This method comprises:

projection of the image according to the luminance component if the image is a single color image and according to the luminance component and to the chrominance components if the image is a color image;

perceptual sub-bands decomposition of the projected components in the frequency domain according to a visibility threshold of a human eye; the sub-bands are obtained by carving up the frequency domain both in spatial radial frequency and orientation; each resulting sub-band may be regarded as the neural image corresponding to a population of visual cells tuned to a range of spatial frequency and a particular orientation;

extraction of salient elements of the sub-bands related to the luminance component and related to the chrominance components, i.e. the most important information from the sub-band;

contour enhancement of the salient elements in each sub-band related to the luminance and chrominance components;

calculation of a saliency map for the luminance component from the enhanced contours of the salient elements of each sub-band related to the luminance component;

calculation of a saliency map for each chrominance components from the enhanced contours of the salient elements of each sub-band related to the chrominance components;

creation of the saliency map as a function of the saliency maps obtained for each sub-band.

It will be appreciated, however, that the invention is not restricted to this specific method of saliency level determination. Any method enabling the perceptual interest data to be calculated (e.g. saliency maps) in a picture is suitable. For example, the method described in the document by Itti et al entitled "*A model of saliency-based visual attention for rapid scene analysis*" and published in 1998 in IEEE trans. on PAMI can be used. The level of saliency for the face Fi can be obtained by averaging the saliency values associated with the pixels located in the face Fi. When a face is salient, its saliency level is high. On the contrary when a face is not salient, its saliency level is low.

In a step S146, the sharpness level LBi, the depth level LDi, the saliency level LSi and the size Sz of the face Fi are linearly combined into a weight Wi. Exemplarily, Wi=KB*LBi/K+KD*LDi/K+KS*LSi/K+KSz*Sz/Sim, where Sim is the size of the picture and K is a constant used for normalizing the values between 0 and 1. If the values of LBi, LDi and LSi are in the range [0; 255], then K=255. The parameters KB, KD, KS and KSz are defined such that KB+KD+KS+KSz=1. Exemplarily, KB=KD=KS=KSz=0.25. In a variant, KB=KD=KS=0 and KSz=1. In the latter case, the weight is only responsive to the size of the face. The values of the parameters can be set up via the Input/Output interface(s) 130 of the processing device 1. Using different values for the parameters makes it possible to weight differently the various levels and size.

The steps S140 to S144 are iterated until a weight is determined for each face Fi detected in step S12.

Figure 5:
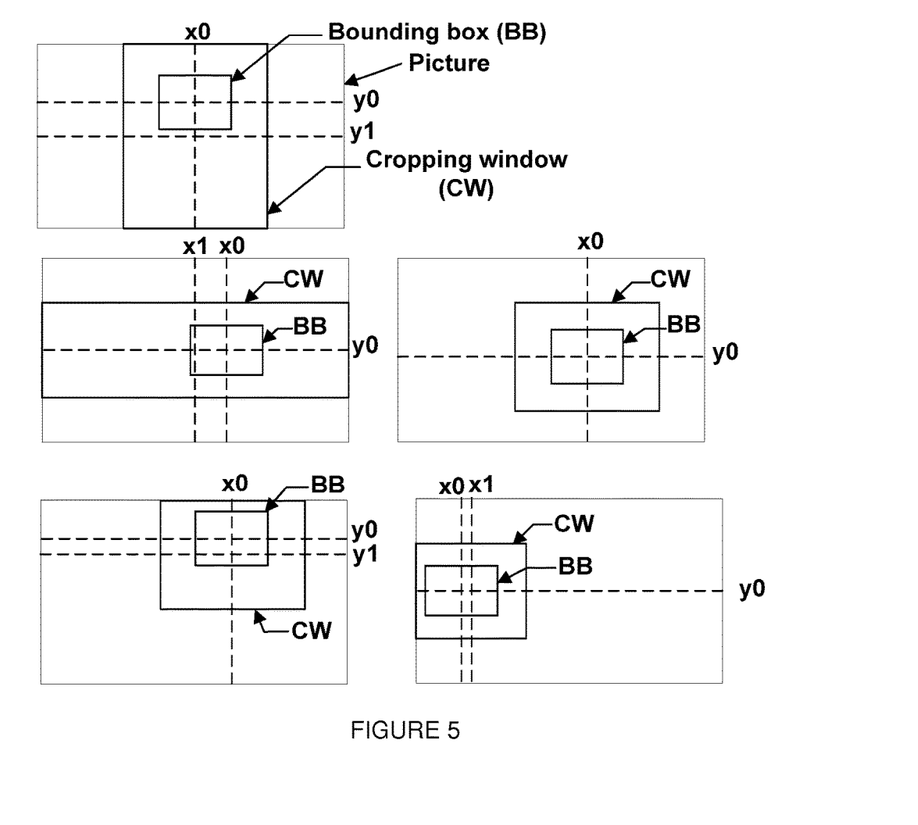
FIG. 5 represents a cropping window centered on a bounding box according to various embodiments of the invention.

In a step S16, the position of the cropping window CW in the picture Y is modified based on the weights determined in step S14. The position of the cropping window in the picture Y is modified so that it is centered on a bounding box, wherein the bounding box comprises at least the detected face with the highest weight. In the case where there is a single face in the picture, the cropping window is centered on the bounding box enclosing the single face. The bounding box is to be understand as the minimum bounding box also called enclosing box. The minimum bounding box refers to the box with the smallest area within which all the pixels of the detected face lie. The cropping window centered on the bounding box is represented on FIG. 5 according to various embodiments. On this figure the center of the bounding box is of coordinates (x0, y0) and the center of the cropping window is of coordinates (x1, y1). On the top left part of the FIG. 5, the cropping window obtained at step S10 is as high as the picture Y. In this case, the cropping window is centered on the bounding box when the abscissa of their centers are identical (x0=x1) while the ordinates of their centers (y0 and y1) are possibly different. On the middle left part of the FIG. 5, the cropping window obtained at step S10 is as wide as the picture Y, then the cropping window is centered on the bounding box when the ordinates of their centers are identical (y0=y1) while the ordinates of their centers (x0 and x1) are possibly different. On the middle right part of the FIG. 5, the cropping window obtained at step S10 is centered on the bounding box when their respective centers are co-located, i.e. have an identical spatial position (x0, y0). On the bottom left part of the FIG. 5, the bounding box is close to a top or bottom border of the picture. In this case, the cropping window is centered on the bounding box when the abscissa of their centers are identical (x0=x1) while the ordinates of their centers (y0 and y1) are possibly different. On the bottom right part of the FIG. 5, the bounding box is close to a left or right border of the picture. In this case, the cropping window is centered on the bounding box when the ordinates of their centers are identical (y0=y1) while the abscissa of their centers (x0 and x1) are possibly different.

Figure 6:
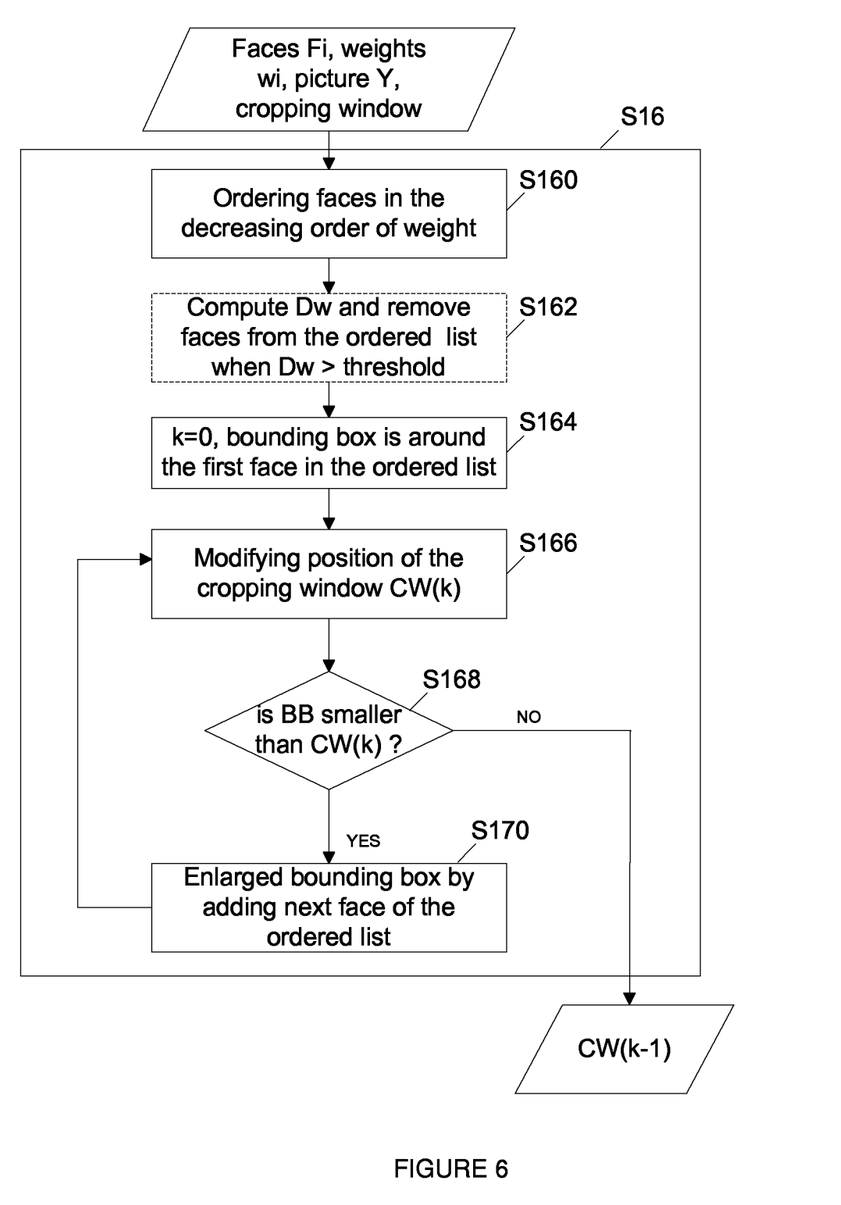
FIG. 6 represents a detail of the flowchart depicted on FIG. 3 according to a specific and non-limitative embodiment of the invention.
Figure 7:
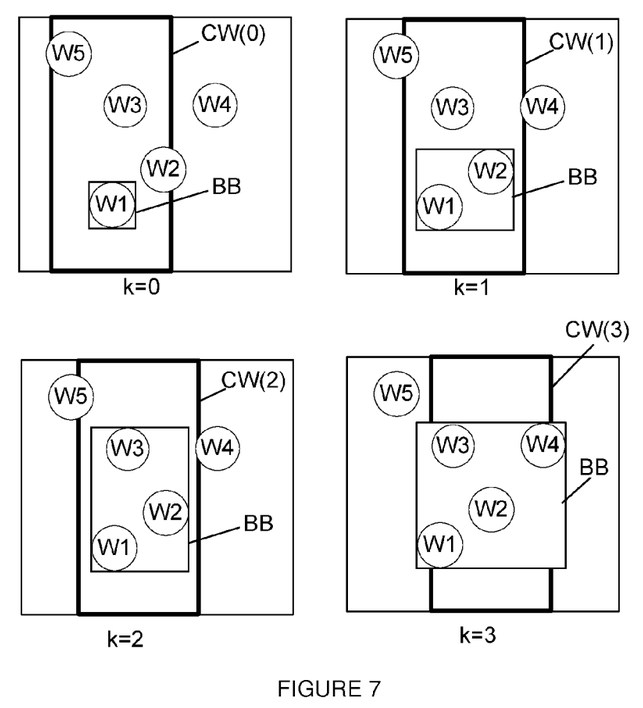
FIG. 7 illustrates different iterations of the method according to a specific and non-limitative embodiment of the invention.

According to a specific embodiment depicted on FIG. 6, the faces are ordered in the decreasing order of their weights in a step S160. In a step S164, the bounding box is set around the first face in the list and the position of the cropping window CW(k) is modified in a step S166 so that it is centered on the bounding box, where k is an integer indicating an iteration. If the bounding box is smaller (check at step S168) than the cropping window CW(k) then the bounding box is enlarged in a step S170 so that it further comprises the second face in the list. The position of the cropping window is modified so that is centered on the bounding box. If the bounding box is still smaller than the cropping window then the bounding box is enlarged to include the next face in the list. The steps S170 of enlarging the bounding box with a new face in the list and S166 of modifying the position of the cropping window so that it is centered on the bounding box are repeated while the enlarged bounding box remains smaller than the cropping window and while there are remaining faces in the list. FIG. 7 illustrates different iterations of the method. In the first iteration (top left part of the picture), the bounding box BB is around the first face in the list whose weight is w1. The cropping window position is thus modified such that CW(0) is centered on the bounding box. Since the bounding box is smaller than the cropping window, i.e. does not overlap it, the method continues at iteration k=1. At this iteration (top right part of the picture), the bounding box is enlarged by adding the face of weight w2 in the bounding box. The cropping window position is thus modified such that CW(1) is centered on the bounding box. Since the bounding box is smaller than the cropping window, the method continues at iteration k=2. At this iteration (bottom right part of the picture), the bounding box is enlarged by adding the face of weight w3 in the bounding box. The cropping window position is thus modified such that CW(2) is then centered on the bounding box. Since the bounding box is smaller than the cropping window, the method continues at iteration k=3. At this iteration (bottom right part of the picture), the bounding box is enlarged by adding the face of weight w4 in the bounding box. The cropping window position is thus modified such that CW(3) is centered on the bounding box. Since the bounding box is larger than the cropping window, the method ends. The final cropping window to be used for the cropping is the one determined at the previous iteration, i.e. CW(2).

Figure 8:
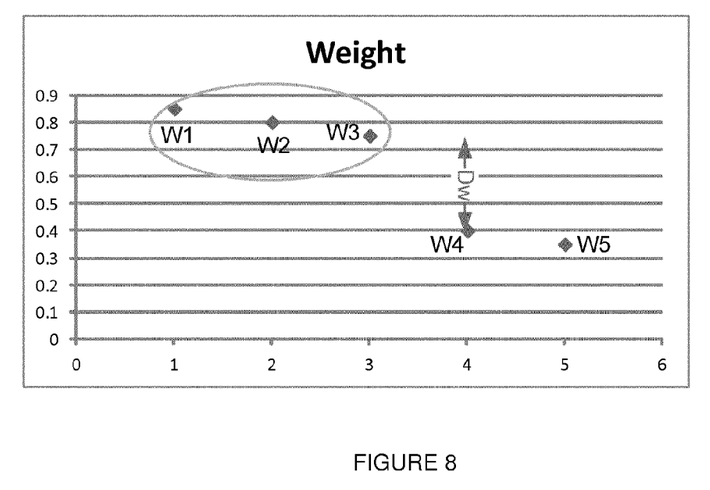
FIG. 8 represents the weights of faces ordered in a decreasing order.

According to another embodiment, the method comprises a preliminary step S162. In the step S162, the differences Dw between the weights of two consecutive faces in the ordered list are calculated. When a difference Dw is above a threshold value then only precedent faces in the list are kept, i.e. the faces whose weights are W1, W2 and W3, as depicted on FIG. 8. The other faces, i.e. the faces whose weights are W4 and W5, are removed from the ordered list. The reduced list is then used by the steps S164 to S168. The threshold can be set by a user. Exemplarily, the threshold value is equal to 0.7*w1, where w1 is the weight of the first face in the ordered list.

Figure 9:
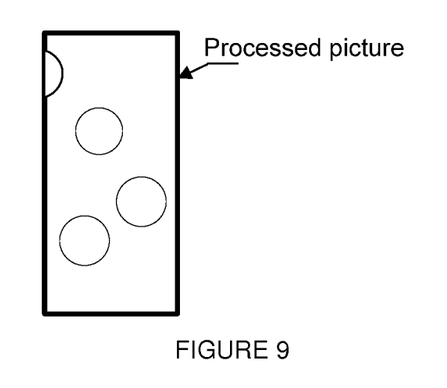
FIG. 9 represents a processed picture after cropping according to a specific and non-limitative embodiment of the invention.

In a step S18, the picture Y is processed by cropping the picture part delimited by the modified cropping window W. The cropped picture can be stored in a memory or sent to a destination. FIG. 9 represents the processed picture after cropping. With respect to FIG. 7, only the part of the picture delimited by CW(2) is kept.

The present principles may be applied to objects of interest other than faces, e.g. animals in a field.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Implementations of the various processes and features described herein may be embodied in a variety of different equipment or applications, particularly, for example, equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method comprising:
obtaining, by a processor, a cropping window in a picture comprising a plurality of objects of interest;
detecting, by the processor, each object of interest of said plurality of objects;
determining, by the processor, a weight for each of said detected object of interest, wherein said weight is determined at least based on a size of the corresponding detected object of interest;
modifying, by the processor, a position of the cropping window in said picture based on said weights; and
cropping, by the processor, the picture part delimited by said cropping window to generate a reduced size version of the picture for display on a screen of a display device,
wherein modifying the position of the cropping window in said picture based on said weights comprises:
a) ordering, by the processor, said plurality of objects of interest in a decreasing order of said weights to form an ordered list of objects of interest;
b) modifying, by the processor, the position of the cropping window so that it is centered on a bounding box comprising at least the first object of interest of the ordered list;
c) enlarging, by the processor, said bounding box by adding a next object of interest of the ordered list;
d) repeating b) and c) until the bounding box becomes larger than the cropping window.

2. The method of claim 1, wherein ordering said plurality of objects of interest in a decreasing order of said weights to form an ordered list of objects of interest is followed by calculating one or more differences between the weights of two consecutive objects of interest in the ordered list and removing, from the ordered list of objects of interest, the two consecutive objects of interest following a difference above a threshold value.

3. The method of claim 1, wherein determining said weight for each object of interest of said plurality of objects of interest comprises for one object of interest:
determining a level of sharpness;
determining a level of depth;
determining a level of saliency; and
calculating said weight as a linear combination of said level of sharpness, said level of depth, said level of saliency and said size.

4. The method of claim 1, wherein the objects of interest are faces.

5. A device comprising:
at least one processor; and
at least one non-transitory processor readable medium having stored therein instructions for causing the at least one processor to:
obtain a cropping window in a picture comprising a plurality of objects of interest;
detect each object of interest of said plurality of objects;
determine a weight for each of said detected object of interest, wherein said weight is determined at least based on a size of the corresponding detected object of interest;
modify a position of the cropping window in said picture based on said weights; and
crop the picture part delimited by said cropping window to generate a reduced size version of the picture for display on a screen of a display,
wherein to modify the position of the cropping window in said picture based on said weights comprises:
a) ordering said plurality of objects of interest in a decreasing order of said weights to form an ordered list of objects of interest;
b) modifying the position of the cropping window so that it is centered on a bounding box comprising at least the first object of interest of the ordered list;
c) enlarging said bounding box by adding a next object of interest of the ordered list;
d) repeating b) and c) until the bounding box becomes larger than the cropping window.

6. The device of claim 5, wherein ordering said plurality of objects of interest in a decreasing order of said weights to form an ordered list of objects of interest is followed by calculating one or more differences between the weights of two consecutive objects of interest in the ordered list and removing, from the ordered list of objects of interest, the two consecutive objects of interest following a difference above a threshold value.

7. The device of claim 6, wherein determining said weight for each object of interest of said plurality of objects of interest comprises for one object of interest:
determining a level of sharpness;
determining a level of depth;
determining a level of saliency; and
calculating said weight as a linear combination of said level of sharpness, said level of depth, said level of saliency and said size.

8. The device of claim 5, wherein the objects of interest are faces.

9. A non-transitory processor readable medium having stored therein instructions for causing a processor to perform at least the steps of the method of claim 1.

* * * * *